(12) United States Patent
Ghosh et al.

(10) Patent No.: US 12,386,723 B2
(45) Date of Patent: Aug. 12, 2025

(54) HIGH-SPEED OFFLOADING OF TRACE DATA FROM AN INTEGRATED CIRCUIT

(71) Applicant: Xilinx, Inc., San Jose, CA (US)

(72) Inventors: Ishita Ghosh, San Jose, CA (US); Elessar Taggart, Longmont, CO (US); Rishi Bharadwaj Subramanian, Santa Clara, CA (US); Jason Richard Villarreal, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 107 days.

(21) Appl. No.: 18/193,444

(22) Filed: Mar. 30, 2023

(65) Prior Publication Data
US 2024/0330144 A1 Oct. 3, 2024

(51) Int. Cl.
*G06F 9/44* (2018.01)
*G06F 11/34* (2006.01)

(52) U.S. Cl.
CPC ........ *G06F 11/348* (2013.01); *G06F 11/3476* (2013.01)

(58) Field of Classification Search
CPC .............................. G06F 11/348; G06F 11/3476
See application file for complete search history.

(56) References Cited

U.S. PATENT DOCUMENTS

| | | | |
|---|---|---|---|
| 7,490,227 B1 | 2/2009 | Bilski | |
| 8,042,007 B1 | 10/2011 | Chan | |
| 8,117,577 B1 | 2/2012 | Vadi | |
| 9,144,150 B2 | 9/2015 | Wu | |
| 10,346,572 B1 | 7/2019 | Corbett | |
| 10,474,610 B1 | 11/2019 | Schelle | |
| 2005/0039078 A1* | 2/2005 | Bradley | G06F 11/348 |
| | | | 714/E11.203 |
| 2018/0225063 A1* | 8/2018 | Singhvi | G06F 3/0673 |
| 2023/0074456 A1* | 3/2023 | Liang | G06F 11/2289 |

OTHER PUBLICATIONS https://www.xilinx.com/products/boards-and-kits/smartlynq-plus.html#information, last visited Mar. 30, 2023.
Kilinx, LogicCORE IP Aurora 64B/66B v4.2, DS528 Mar. 1, 2011.

* cited by examiner

*Primary Examiner* — Hang Pan
(74) *Attorney, Agent, or Firm* — Kevin T. Cuenot

(57) ABSTRACT

Offloading trace data from an integrated circuit (IC) can include receiving, by a high-speed debug port (HSDP) trace circuit, streams of trace data from a plurality of compute circuits of different compute circuit types. The compute circuits and the HSDP trace circuit are disposed in a same IC. Compute circuit type identifiers are included within the trace data. The compute circuit type identifiers specify the compute circuit type from which respective ones of the streams of the trace data originate. Debug trace packets (DTPs) are generated from the trace data and transmitted over a high-speed communication link to a trace data storage device (TDSD) external to the IC. Within the TDSD, trace data from the DTPs are stored in a memory of the TDSD.

20 Claims, 10 Drawing Sheets

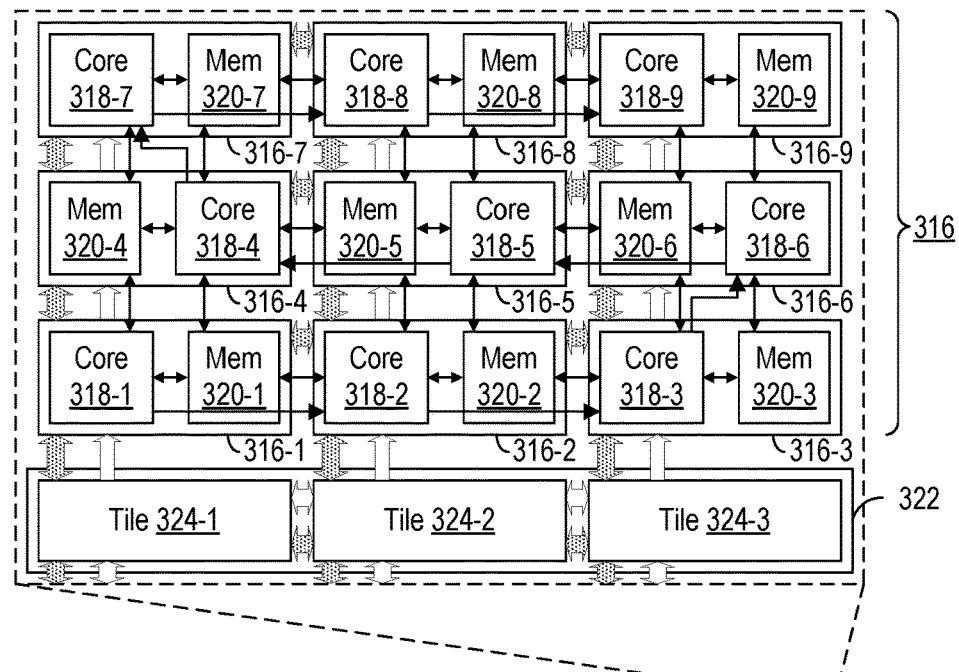
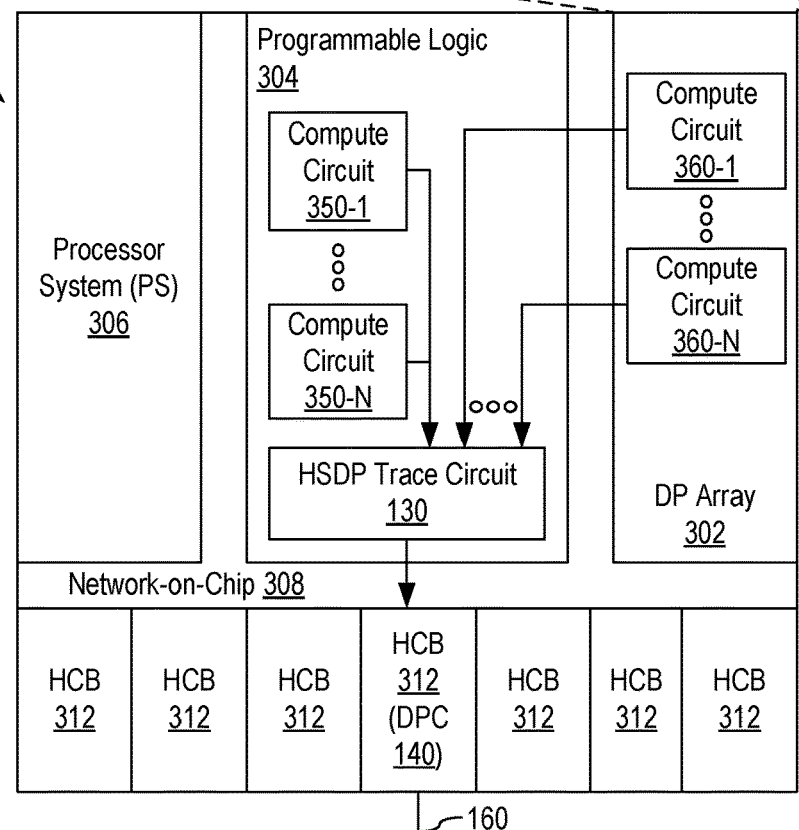
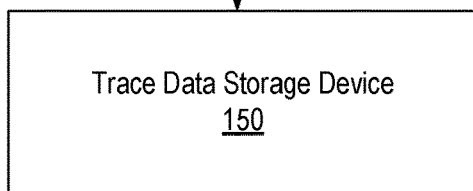
FIG. 3

600

Receive, by a high-speed data port trace circuit, a plurality of streams of trace data from a plurality of compute circuits of different compute circuit types, wherein the plurality of compute circuits and the high-speed data port trace circuit are disposed in a same integrated circuit
602

↓

Include compute circuit type identifiers within the trace data, wherein the compute circuit type identifiers specify the compute circuit type from which respective ones of the plurality of streams of the trace data originate
604

↓

Generate debug trace packets from the trace data and transmit the debug trace packets over a high-speed communication link to a trace data storage device that is external to the integrated circuit
606

↓

Store the trace data from the debug trace packets in a memory of the trace data storage device
608

↓

Within the trace data storage device, differentiate between the debug trace packets according to the compute circuit type identifiers
610

↓

Read trace data out of trace data storage device based on compute circuit type identifiers included in trace data
612

FIG. 6

HIGH-SPEED OFFLOADING OF TRACE DATA FROM AN INTEGRATED CIRCUIT

TECHNICAL FIELD

This disclosure relates to integrated circuits (ICs) and, more particularly, to high-speed offloading of trace data from an IC.

BACKGROUND

Modern integrated circuits (ICs) often include a variety of different types of compute circuits. Examples of compute circuits that may be included in a single IC include, but are not limited to, a processor (e.g., a central processing unit or other processor) configured to execute program code, a dedicated and hardened circuit block configured to perform a particular task, a user-specified circuit implemented in programmable circuitry (e.g., programmable logic), a processor array, a graphics processing unit (GPU), or the like. In developing a design using an IC including a plurality of different types of compute circuits, it is often necessary to collect trace data from the various compute circuits to ensure that the design is operating as intended and/or to debug the design.

In the case of certain types of ICs, e.g., adaptive or programmable ICs, existing techniques for collecting trace data utilize the on-chip programmable logic resources to implement the trace data collection infrastructure and allocate portions of the on-chip memory for storing the trace data. A number of the different types of compute circuits available in ICs are capable of generating large quantities of trace data in short periods of time. This means that the amount of on-chip memory needed to store trace data over even a small window of time may be quite large. Using on-chip programmable logic resources and on-chip memory for storing trace data renders the resources unavailable for use by user circuit designs. In the case of an adaptive IC, for example, this may adversely affect operation of a user design implemented in the IC or limit the overall size of the user design that may be implemented in the IC.

SUMMARY

In one or more example implementations, a method includes receiving, by a high-speed debug port trace circuit, a plurality of streams of trace data from a plurality of compute circuits of different compute circuit types. The plurality of compute circuits and the high-speed debug port trace circuit are disposed in a same integrated circuit. The method includes including compute circuit type identifiers within the trace data. The compute circuit type identifiers specify the compute circuit type from which respective ones of the plurality of streams of the trace data originate. The method includes generating debug trace packets from the trace data and transmitting the debug trace packets over a high-speed communication link to a trace data storage device that is external to the integrated circuit. The method includes storing the trace data from the debug trace packets in a memory of the trace data storage device.

The foregoing and other implementations can each optionally include one or more of the following features, alone or in combination. Some example implementations include all the following features in combination.

In some aspects, the high-speed debug port trace circuit is implemented using programmable circuitry to receive a user-specified number of streams of the trace data from one or more first compute circuits of the plurality of compute circuits, wherein the one or more first compute circuits are implemented as a first compute circuit type.

In some aspects, the first compute circuit type is a data processing array configured to provide a plurality of streams of the trace data to the high-speed debug port trace circuit.

In some aspects, the high-speed debug port trace circuit is implemented to receive a user-specified data stream from one or more second compute circuits of the plurality of compute circuits. The one or more second compute circuits are implemented as a second compute circuit type.

In some aspects, the one or more second compute circuits of the second compute circuit type are implemented in programmable circuitry.

In some aspects, generating debug trace packets includes creating the debug trace packets by adding headers.

In some aspects, the method includes differentiating between the trace data according to the compute circuit type identifiers. The method also includes outputting the trace data according to compute circuit type to an external data processing system.

In some aspects, the method includes continuing to receive the trace data from the plurality of compute circuits, generate debug trace packets, and transmit the debug trace packets to the trace data storage device while a processor executing program code and coupled to the plurality of compute circuits is in a hung state. The processor may be executing an application (e.g., the program code) that causes the processor to hardware accelerate tasks or operations by sending, or "offloading," such tasks or operations to the respective compute circuits in lieu of the processor performing such tasks or operations.

In some aspects, the high-speed debug port trace circuit operates as an agent of the plurality of compute circuits in receiving the plurality of streams of trace data from the plurality of compute circuits. The high-speed debug port trace circuit also can operate as an agent of a debug packet controller configured to packetize the trace data for transmission over the high-speed communication link.

In some aspects, the method includes performing a first arbitration among a subset of two or more of the plurality of streams of trace data originating from one or more of the compute circuits of a same compute circuit type. The method can include performing a second arbitration between a selected stream output from the first arbitration and a stream of the trace data originating from a different compute circuit of a different compute circuit type.

In some aspects, a system includes an integrated circuit. The integrated circuit includes a plurality of compute circuits of different compute circuit types, a high-speed debug port trace circuit configured to receive a plurality of streams of trace data from the plurality of compute circuits, and a debug packet controller coupled to the high-speed debug port trace circuit. The debug packet controller is configured to generate debug trace packets from the trace data and convey the debug trace packets over a communication link outside of the integrated circuit. The system includes a trace data storage device coupled to the communication link and configured to receive the trace data packets. The trace data storage device includes a packet processor configured to extract trace data from the debug trace packets, a direct memory access circuit couple to the packet processor, and a memory. The direct memory access circuit is configured to store the trace data in the memory as extracted.

In some aspects, the high-speed debug port trace circuit includes a plurality of stream inputs coupled to the plurality of compute circuits. The plurality of stream inputs are configured to receive the plurality of streams of trace data and operate as agents. The high-speed debug port trace circuit can include an output interface coupled to the debug packet controller. The output interface is configured to convey the trace data to the debug packet controller. The output interface is configured to operate as an agent of the debug packet controller.

In some aspects, the high-speed debug port trace circuit is configured to perform a first arbitration among a subset of two or more of the plurality of streams of trace data originating from one or more of the compute circuits of a same compute circuit type and perform a second arbitration between a stream output from the first arbitration and a stream of the trace data originating from a different compute circuit of the plurality of compute circuits of a different compute circuit type.

In some aspects, the high-speed debug port trace circuit is configured to insert compute circuit type identifiers within the trace data. The compute circuit type identifiers specify the compute circuit type from which different streams of the trace data originate.

In some aspects, the debug packet controller is configured to generate the debug trace packets by, at least in part, adding headers.

In some aspects, the trace data storage device includes a processor. The processor is capable of differentiating between the trace data stored in the memory according to the compute circuit type identifiers. The processor is capable of outputting the trace data according to compute circuit type to an external data processing system.

In some aspects, the high-speed debug port trace circuit is implemented using programmable circuitry to receive a user-specified number of streams of the trace data from one or more first compute circuits of the plurality of compute circuits. The one or more first compute circuits are implemented as a first compute circuit type.

In some aspects, the first compute circuit type is a data processing array configured to provide a plurality of streams of the trace data to the high-speed debug port trace circuit.

In some aspects, the high-speed debug port trace circuit is implemented to receive a user-specified data stream from one or more second compute circuits of the plurality of compute circuits. The one or more second compute circuits are implemented as a second compute circuit type. The one or more second compute circuits of the second compute circuit type are implemented in programmable circuitry.

In some aspects, the high-speed debug port trace circuit continues to process trace data from the plurality of compute circuits and generate debug trace packets. The debug packet controller continues to transmit the debug trace packets to the trace data storage device while a processor executing program code and coupled to the plurality of compute circuits is in a hung state. The processor may be executing an application (e.g., the program code) that causes the processor to offload tasks or operations to the respective compute circuits.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 illustrates another example implementation of the system of FIG. 1.

FIG. 6 illustrates an example method of operation of the trace data offload architecture illustrated in FIGS. 1, 3, 4, and 5.

DETAILED DESCRIPTION

Figure 1:
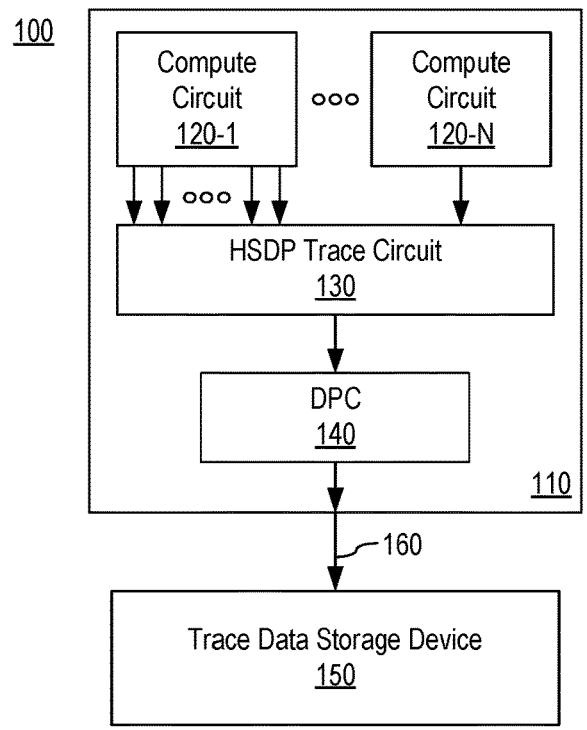
FIG. 1 illustrates an example system for offloading trace data from an integrated circuit.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to high-speed offloading of trace data from an IC. In accordance with the inventive arrangements described within this disclosure, an architecture for collecting and offloading trace data from one or more different types of compute circuits of an IC is provided. The architecture is capable of receiving a plurality of different streams of trace data from the various compute circuits of an IC. The trace data may be packetized into debug trace packets and conveyed from the IC including the compute circuits to a trace data storage device that is external to the IC. The trace data storage device may include circuitry that is capable of performing various packet processing functions to store the trace data as extracted from the debug trace packets within a memory.

In accordance with the inventive arrangements described herein, the example architectures alleviate the need to store trace data in on-chip memory of the IC. Rather, the trace data may be processed efficiently and offloaded from the IC to a separate and distinct trace data storage device. This facilitates near limitless storage of trace data as the amount of memory available in the trace data storage device may exceed that available in the IC.

In one or more aspects, the hardware implemented in the trace data storage device is configured to operate in coordination with hardware implemented in the IC to provide real time or near real time performance with respect to offloading the trace data. The performance achieved by way of the dedicated components of the architecture described surpasses that of other offloading techniques that attempt to offload data from the IC to a host computer directly, for example.

In one or more aspects, the example architectures are capable of receiving a plurality of different streams of trace data from the plurality of different types of compute circuits. Whereas other trace data collection and/or offload techniques typically employ a strategy in which different (e.g., separate and distinct) architectures are used for handling trace data originating from each different type of compute circuit, the inventive arrangements disclosed herein are capable of using a single architecture, described herein below, to handle streams of trace data originating from multiple different types of compute circuits. This approach does not over utilize or monopolize on-chip memory (e.g., an on-chip random access memory (RAM) such as a Double Data Rate (DDR) Synchronous Dynamic RAM) for trace data storage. Further, a larger number of programmable logic resources of the IC remain available for user circuit designs since there is no need to implement a different trace data offload architecture for each different type of compute circuit.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example system 100. System 100 is capable of implementing trace data offload for an IC as shown. In the example, system 100 includes an IC 110 coupled to a trace data storage device 150. Trace data storage device 150 is separate and distinct from IC 110.

IC 110 includes a plurality of compute circuits of different types illustrated as compute circuits 120-1 through 120-N. Compute circuits 120 are capable of conveying trace data as a plurality of streams to a high-speed debug port (HSDP) trace circuit 130. HSDP trace circuit 130 is capable of processing the trace data as received over the multiple different streams and providing the processed trace data as a single stream or output to a debug packet controller (DPC) 140. DPC 140 is capable of packetizing the received debug trace data into debug trace packets (DTPs). DPC 140 conveys the DTPs over a communication link 160 to trace data storage device 150.

In one or more aspects, communication link 160 may be implemented as a high-speed serial communication link. An example of a high-speed serial interface is the Aurora 64B/66B interface (Aurora interface) available from Advanced Micro Devices, Inc. of Santa Clara, California. The Aurora interface is capable of providing high-speed serial communication. For example, communication link 160 may provide data transfer speeds of multiple gigabits per second. It should be appreciated the Aurora 64B/66B interface is used for purposes of illustration and not limitation. Other high-speed communication links may be used.

Figure 7:
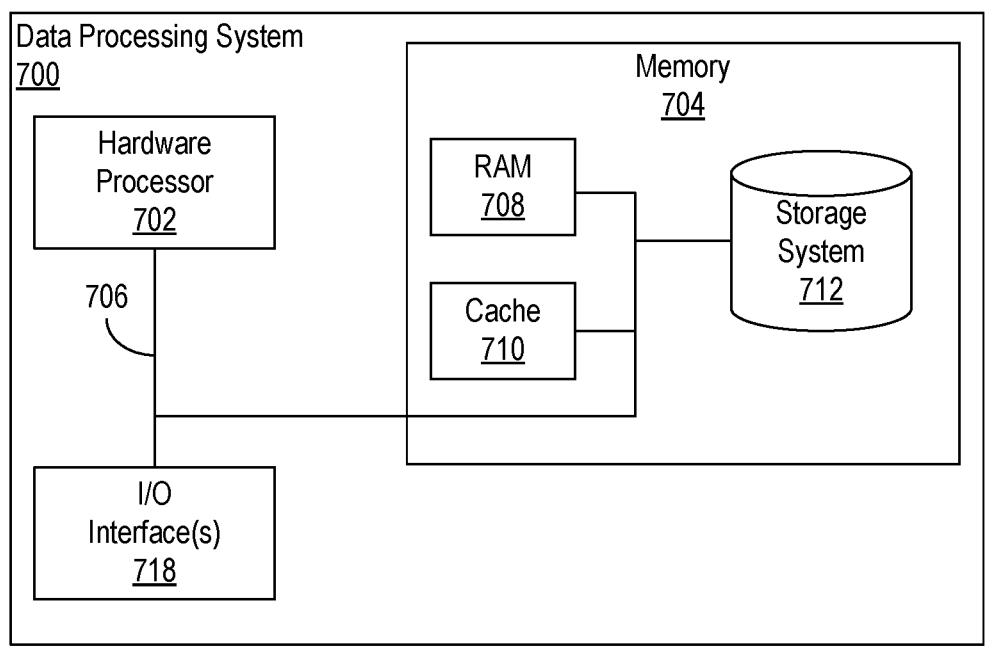
FIG. 7 illustrates an example implementation of a data processing system.

Trace data storage device 150 is capable of storing trace data received in the form of the DTPs within an internal memory. The trace data may be read out of trace data storage device 150 by another system such as a computer system (not shown). An example of a computer system capable of reading the trace data from trace data storage device 150 is illustrated in the example of FIG. 7.

Continuing with the example of FIG. 1, HSDP trace circuit 130 is capable of receiving a plurality of different streams from one or more compute circuits 120-1 through 120-N. In one aspect, HSDP trace circuit 130 may receive a single stream from a collection of compute circuits 120. Compute circuits 120-1 may be a first type of compute circuit while compute circuits 120-N are a different, e.g., second, type of compute circuit. Within this disclosure, the type of a compute circuit means the particular circuit subsystem of IC 110 in which the compute circuit is implemented.

In the example, the streams may be implemented as Advanced Microcontroller Bus Architecture (AMBA) extensible Interface (AXI) (hereafter "AXI") compatible streams. AXI defines an embedded microcontroller bus interface for use in establishing on-chip connections between compliant circuit blocks and/or systems. Throughout this disclosure, the AXI protocol and communication bus is referenced. It should be appreciated that AXI is provided as an illustrative example of a bus interface and is not intended as a limitation of the examples described within this disclosure. Other similar and/or equivalent protocols, communication buses, bus interfaces, and/or interconnects may be used in lieu of AXI and that the various example circuit blocks and/or signals provided within this disclosure will vary based on the particular protocol, communication bus, bus interface, and/or interconnect that is used.

Figure 2:
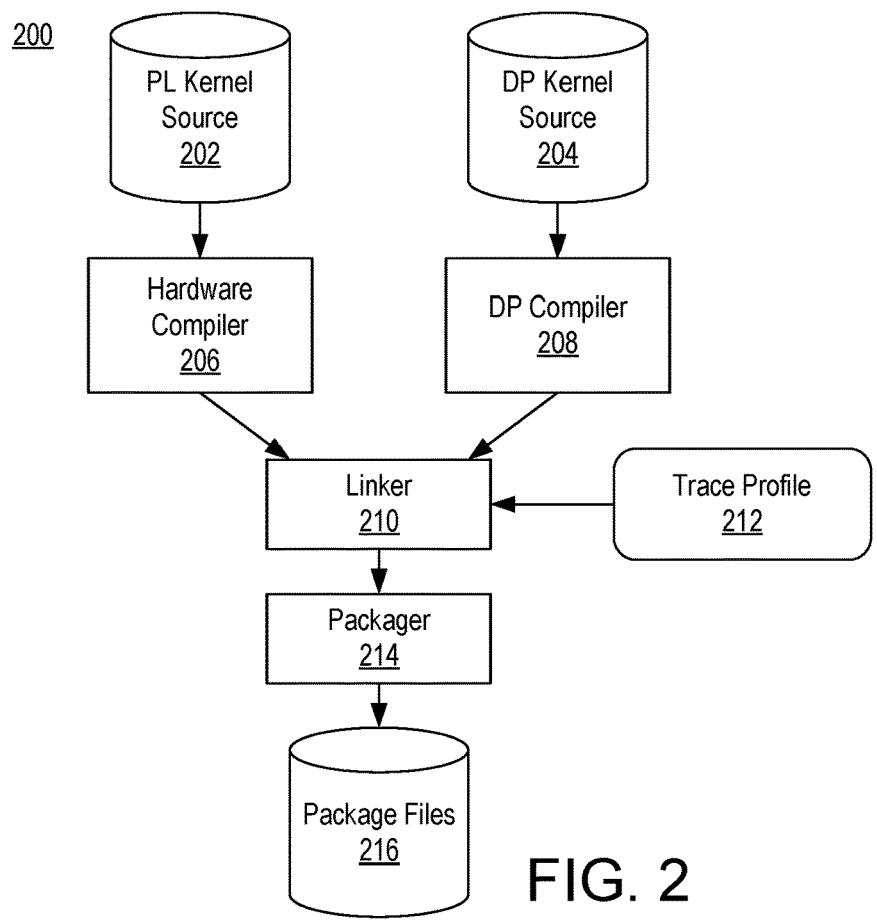
FIG. 2 illustrates an example design flow for implementing a design in an IC that supports offloading of trace data from the IC.

FIG. 2 illustrates an example design flow 200 for implementing a design in an IC such as IC 110 of FIG. 1 that supports a plurality of different types of compute circuits. For purposes of illustration, one type of the compute circuits 120 of IC 110 is programmable logic. Another type of the compute circuits 120 of IC 110 is a data processing (DP) array.

As shown, source code specifying one or more programmable logic kernels (e.g., PL kernel source 202) is provided to a hardware compiler 206. Hardware compiler 206 may generate placed and routed versions of the user specified PL kernels of PL kernel source 202. Source code specifying one or more data processing kernels (e.g., DP kernel source 204) is provided to DP compiler 208. DP compiler 208 may generate executable and placed versions of DP kernels of DP kernel source 204. The compiled PL kernel source 202 and the compiled DP kernel source 204 are provided to linker 210.

Linker 210 receives the compiled PL kernel source 202 and the compiled DP kernel source 204 along with a trace profile 212. In response to trace profile 212 or as specified by trace profile 212, linker 210 instruments the user's design by inserting an Intellectual Property (IP) core corresponding to HSDP trace circuit 130 and optionally other monitoring IP cores into the design and links the various user-specified and HSDP IP core components together. For example, trace profile 212, in addition to indicating that HSDP trace circuit 130 is to be included in the design, indicates that the HSDP trace circuit 130 is to receive trace data from one or more enumerated compute circuits 120, corresponding to respective ones of the user-specified kernels, in place of storing the trace data in an internal memory (e.g., an on-chip RAM such as a DDR memory) of IC 110. For example, trace profile 212 may include a directive such as: "trace memory=HSDP" indicating that the HSDP trace circuit 130 is to be included and that trace data is to be routed or provided to HSDP trace circuit 130 in lieu of an on-chip memory. Trace profile 212 may include a directive such as "dparray_trace_offload=HSDP" indicating that the trace data for a compute circuit 120 implemented in a DP array is to be provided to the inserted HSDP trace circuit 130. Trace profile 212 may also include user-specified configuration parameters used to configure HSDP trace circuit 130.

From the linked components generated by linker 210, packager 214 is capable of generating one or more binary files/images that may be loaded into IC 110 to implement the user design (e.g., PL kernel source 202 and DP kernel source 204) within IC 110 along with a trace data offload circuit architecture. Packager 214, for example, is capable of generating the files required for IC 110 to boot and run the user design including compute circuits 120 and HSDP trace circuit 130. It should be appreciated that if additional kernels implemented as different types of compute circuits are used, such other kernels may be compiled through their respective compilers and linked by linker 210.

In one or more example implementations, linker 210 is capable of generating a metadata section that may be included in packaged files 216. The metadata section may specify information such as instance names, addresses, versions, and/or other properties of IP cores included in the user design (e.g., formed of PL kernel source 202 and/or DP kernel source 204). Runtime drivers/tools are capable of reading the metadata section at runtime of the design in IC 110 to access any debug and/or trace IP instances in IC 110.

For example, an entry corresponding to the HSDP IP core may be included in the metadata section that specifies such data for the HSDP IP core. The entry may include, for example an instance name, an address, and a property field, wherein the property field indicates whether different input types are present (e.g., whether 1, 2, or more different compute circuit types are included in the user's design). At runtime, this entry is used by a processor tasked with configuring aspects of the design as implemented in IC 110 to configure DPC 140 with the address (e.g., IP address) of HSDP trace circuit 130 (e.g., the address of output interface 514).

In another aspect, the property field is used to determine whether the trace packets will have a type information field. The property field, being formed of one or more bits in the metadata entry for the HSDP IP core, may be set to a particular value at link time. In one or more example implementations, the particular value indicates whether the HSDP IP core is connected to a single type of trace origin (e.g., a single type of compute circuit) or multiple different types of trace origin (e.g., multiple different types of compute circuits). At runtime, software executed by trace data storage device 150 (e.g., software executed by processor 418 to be described in greater detail in connection with FIG. 4) uses this property field for configuring various components. For example, if the bit(s) in the property field indicate multiple different trace streams, then a packet processor within trace data storage device 150 will expect type-info to be present in received DTPs and process the DTPs accordingly. For purposes of illustration, the property field may specify that the compute circuits are DP array only, programmable logic only, both DP array and programmable logic, and/or other compute circuit(s) of other circuit subsystems of IC 110. Still, as noted, other types may be supported depending on the particular architecture of IC 110 and the various circuit subsystems of compute circuitry included therein.

FIG. 3 illustrates another example implementation of system 100 of FIG. 1. In the example of FIG. 3, the architecture of IC 110 is illustrated in greater detail. IC 110 is an example of an adaptive IC. IC 110 is also an example of a programmable IC. IC 110 is also illustrative of a System-on-Chip (SoC). An adaptive IC is an IC that may be updated subsequent to deployment of the device into the field. An adaptive IC may be optimized, e.g., configured or reconfigured, for performing particular operations after deployment. The optimization may be performed repeatedly over time to meet different requirements or needs. A programmable IC includes any IC that includes at least some programmable circuitry. Examples of programmable circuitry include programmable logic and/or FPGA circuitry.

In the example of FIG. 3, IC 110 is implemented on a single die provided within a single integrated package. In other examples, IC 110 may be implemented using a plurality of interconnected dies where the various programmable circuit resources illustrated in FIG. 3 are implemented across the different interconnected dies.

In the example, IC 110 includes DP array 302, programmable logic 304, a processor system 306, a Network-on-Chip (NoC) 308, and one or more hardwired circuit blocks (HCBs) 312. It should be appreciated that the architecture of IC 110 is provided for purposes of illustration and not limitation. An IC for use with the inventive arrangements described herein may include any of a variety of combinations of the subsystems described herein implementing various types of compute circuits 120. For example, an IC may include one or more processors; one or more processors (e.g., processor system 306) in combination with programmable logic 304; one or more processors (e.g., processor system 306) in combination with a processor array such as DP array 302; programmable logic 304 in combination with DP array 302; or any combination thereof. For purposes of discussion, each of DP array 302, programmable logic 304, processor system 306, and/or each HCB 312 may be considered a different circuit subsystem of IC 110 capable of implementing compute circuits of that particular type.

For purposes of illustration and not limitation, compute circuit 120-1 may be implemented in DP array 302. A second and different compute circuit, e.g., compute circuit 120-N may be implemented in programmable logic 304. As illustrated and described in greater detail below, each of the compute circuits 120 may implement a user-specified kernel (e.g., user-specified function).

DP array 302 is implemented as a plurality of interconnected and programmable compute tiles 316. The term "tile," as used herein in connection with an IC, means a circuit block. Compute tiles 316 may be arranged in an array and are hardwired. Each compute tile 316 can include one or more cores 318 and a memory circuit (abbreviated "Mem" in FIG. 3) 320. In one aspect, each core 318 is capable of executing program code stored in a core-specific program memory contained within each respective core (not shown).

In one aspect, each core 318 may be implemented as a vector processor. For example, cores 318 may be implemented as Very Long Instruction Word (VLIW) processors with Single Instruction Multiple Data (SIMD) vector units. Cores 318 may be highly optimized for compute intensive applications. In other arrangements, cores 318 may be implemented as application-specific circuits capable of performing any of a variety of different tasks.

In one or more examples, each core 318 is capable of directly accessing the memory circuit 320 within the same compute tile 316 and the memory circuit 320 of any other compute tile 316 that is adjacent to the core 318 of the compute tile 316 in the up, down, left, and/or right directions. For example, core 318-5 is capable of directly reading and/or writing (e.g., via respective memory interfaces not shown) memory circuits 320-5, 320-8, 320-6, and 320-2. Core 318-5 sees each of memory circuits 320-5, 320-8, 320-6, and 320-2 as a unified region of memory (e.g., as a part of the local memory accessible to core 318-5). This facilitates data sharing among different compute tiles 316 in DP array 302. In other examples, core 318-5 may be directly connected to memory circuits 320 in other compute tiles.

Compute tiles 316 are interconnected by programmable interconnect circuitry. The programmable interconnect circuitry may include one or more different and independent networks. For example, the programmable interconnect circuitry may include a streaming network formed of streaming connections (shaded arrows) and a memory-mapped network formed of memory-mapped connections (unshaded arrows).

Cores 318 may be directly connected with adjacent cores 318 via core-to-core cascade connections. In one aspect, core-to-core cascade connections are unidirectional and direct connections between cores 318 as pictured. In another aspect, core-to-core cascade connections are bidirectional and direct connections between cores 318. In general, core-to-core cascade connections generally allow the results stored in an accumulation register of a source core 318 to be provided directly to an input of a target or load core 318 without traversing the programmable interconnects and/or being written by a first core 318 to a memory circuit 320 to be read by a different core 318.

In an example implementation, compute tiles 316 do not include cache memories. By omitting cache memories, DP array 302 is capable of achieving predictable, e.g., deterministic, performance. Further, significant processing overhead is avoided since maintaining coherency among cache memories located in different compute tiles 316 is not required. In a further example, cores 318 do not have input interrupts. Thus, cores 318 are capable of operating uninterrupted. Omitting input interrupts to cores 318 also allows DP array 302 to achieve predictable, e.g., deterministic, performance.

Interface block 322 operates as an interface that connects compute tiles 316 to other resources of IC 110. In the example of FIG. 3, interface block 322 includes a plurality of interconnected interface tiles 324 organized in a row. Interface tiles 324 are connected so that data may be propagated from one interface tile to another bi-directionally. Each interface tile 324 is capable of operating as an interface for the column of compute tiles 316 directly above and is capable of interfacing such compute tiles 316 with components and/or subsystems of IC 110 including, but not limited to, programmable logic 304 and/or NoC 308.

In one or more other example implementations, DP array 302 may include memory tiles (not shown). The memory tiles may be interspersed with the compute tiles 316 illustrated. Inclusion of memory tiles within DP array 302 allows DP array 302 to store a larger amount of data locally within DP array 302 without having to access other memories, which would introduce latency into the system. Memory tiles are characterized by the lack of a core and the inclusion of a memory of generally higher capacity than memory circuits 320.

Programmable logic 304 is circuitry that may be programmed to perform specified functions. As an example, programmable logic 304 may be implemented as field-programmable gate array type of circuitry. Programmable logic 304 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of programmable logic is highly configurable unlike hardwired circuitry. Each programmable circuit block of programmable logic 304 typically includes a programmable element (e.g., a functional element) and a programmable interconnect. The programmable interconnects provide the highly configurable topology of programmable logic 304. The programmable interconnects may be configured on a per wire basis to provide connectivity among the programmable elements of programmable circuit blocks of programmable logic 304 and is configurable on a per-bit basis (e.g., where each wire conveys a single bit of information) unlike connectivity among compute tiles 316, for example, that may include multi-bit stream connections capable of supporting packet-based communications.

Processor system 306 is implemented as hardwired circuitry that is fabricated as part of IC 110. Processor system 306 may be implemented as, or include, any of a variety of different processor types each capable of executing program code. For example, processor system 306 may be implemented as one or more processors such as an application processor and/or a real-time processor. Each processor may include one or more cores. Each processor and/or core is capable of executing program code. In still another example, processor system 306 may include one or more processors, cores, modules, co-processors, I/O interfaces, and/or other resources. Processor system 306 may be implemented using any of a variety of different types of architectures. Example architectures that may be used to implement processors and/or cores of processor system 306 may include, but are not limited to, a CISC architecture, a RISC architecture, a vector processing architecture, or other known architecture. Example processors include, but are not limited to, processors having an x86 type of architecture (IA-32, IA-64, etc.), Power Architecture, ARM processors, and the like.

In one or more example implementations, processor system 306 may execute a control program or application that controls operation of one or more kernels of a user design implemented as compute circuits within DP array 302. In other arrangements, a processor disposed in a host data processing system (e.g., hardware processor 702 of FIG. 7) coupled to IC 110 may control execution of the one or more kernels of a user design implemented as compute circuits within DP array 302. In still other examples, IC 110 may include another controller that is dedicated to controlling operation of one or more kernels of a user design implemented as compute circuits within DP array 302.

NoC 308 is a programmable interconnecting network for sharing data between endpoint circuits in IC 110. The endpoint circuits can be disposed in DP array 302, programmable logic 304, processor system 306, and/or selected HCBs 312. NoC 308 can include high-speed data paths with dedicated switching. In an example, NoC 308 includes one or more horizontal paths, one or more vertical paths, or both horizontal and vertical path(s). The arrangement and number of regions shown in FIG. 3 is merely an example. NoC 308 is an example of the common infrastructure that is available within IC 110 to connect selected components and/or subsystems.

Within NoC 308, the nets that are to be routed through NoC 308 are unknown until a user circuit design is created for implementation within IC 110. NoC 308 may be programmed by loading configuration data into internal configuration registers that define how elements within NoC 308 such as switches and interfaces are configured and operate to pass data from switch to switch and among the NoC interfaces to connect the endpoint circuits. NoC 308 is fabricated as part of IC 110 (e.g., is hardwired) and, while not physically modifiable, may be programmed to establish connectivity between different principal circuits and different agent circuits of a user circuit design. NoC 308, upon power-on, does not implement any application data paths or routes therein, but may provide default paths for loading configuration data into selected other subsystems. Once configured, however, NoC 308 implements data paths or routes between endpoint circuits.

HCBs 312 include special-purpose circuit blocks fabricated as part of IC 110. Though hardwired, HCBs 312 may be configured by loading configuration data into control registers to implement one or more different modes of operation. Examples of HCBs 312 may include input/output (I/O) blocks, transceivers for sending and receiving signals to circuits and/or systems external to IC 110, memory controllers, or the like. Examples of different I/O blocks may include single-ended and pseudo differential I/Os. Examples of transceivers may include high-speed differentially clocked transceivers. Other examples of HCBs 312 include, but are not limited to, cryptographic engines, digital-to-analog converters (DACs), analog-to-digital converters (ADCs), and the like. In general, HCBs 312 are application-specific circuit blocks.

In one or more other examples, HCBs 312 may include a RAM, e.g., one or more banks of RAM. As an example, the RAM may be a DDR RAM. In still another example, HCBs 312 may include a High-Bandwidth Memory (HBM). For purposes of illustration, one of HCBs 312 may implement the DPC 140 of FIG. 1.

The various programmable circuit resources illustrated in FIG. 3 may be programmed initially as part of a boot process for IC 110. During runtime, the programmable circuit resources may be reconfigured. At any point during runtime, all or a portion of IC 110 may be reconfigured. In some cases, processor system 306 or another processing system disposed in IC 110 may configure and/or reconfigure programmable logic 304 and/or NoC 308.

In the example of FIG. 3, a plurality of compute circuits 350 are illustrated as being implemented in programmable logic 304. Each of compute circuits 350 represents a user-specified circuit implemented in programmable logic 304 and an example of a compute circuit 120. The particular number of compute circuits shown is not intended as a limitation of the inventive arrangements. For example, a single compute circuits can be used or more compute circuits 350 than shown may be used.

A plurality of compute circuits 360 are illustrated as being implemented in DP array 302. Each of compute circuits 360 represents a user-specified function implemented in one or more compute tiles 316 of DP array 302 and is an example of a compute circuit 120. The particular number of compute circuits 360 shown is not intended as a limitation of the inventive arrangements. For example, a single compute circuit 360 may be used or more compute circuits 360 than shown may be used. As discussed, the type of a given compute circuit refers to the underlying circuit subsystem in which that compute circuit is implemented. Each circuit subsystem has a different underlying circuit architecture. For example, compute circuits 350 represent one type of compute circuit while compute circuits 360 represent another, different type of compute circuit.

DP array 302 and programmable logic 304 can be instrumented with monitor and/or debug circuitry to generate trace data (e.g., hardware trace data) that may be used to observe the operation of a user design. In the example of FIG. 3, trace data may be conveyed from compute circuits 350 to HSDP trace circuit 130. In the example, the trace data from compute circuits 350 may be combined or coalesced into a single stream of trace data. Multiple streams of trace data may be received from DP array 302. In the example, each stream of trace data from DP array 302 may be received by HSDP trace circuit 130 as an individual stream.

Within this disclosure, the trace data may be hardware trace data in that the trace data may be obtained from circuitry that may or may not execute program code. That is, the trace data may be "hardware" trace data in that the trace data may convey various data values generated by a given compute circuit and need not include instruction or program counter trace data. Still, in cases where a compute circuit is implemented as program code and executes on a core 318 and/or a processor of processor system 306, the trace data may include instruction and/or program counter data.

In the example of FIG. 3, HSDP trace circuit 130 is capable of receiving trace data in the form of a plurality of different streams from the different types of compute circuits illustrated. Because HSDP trace circuit 130 is implemented in programmable logic 304, HSDP trace circuit 130 may be customized or configured according to the particular needs of the user's circuit design. As an illustrative example, HSDP trace circuit 130 can be configured to receive stream(s) of trace data from DP array 302 only, a stream of trace data from programmable logic 304 only, or streams of trace data from both DP array 302 and programmable logic 304. In other examples, HSDP trace circuit 130 may receive streams of trace data from one or more other compute circuits of one or more different types. Regardless of the particular scenario in which trace data is to be collected, only a single instance of HSDP trace circuit 130 is needed. That is, separate trace circuits for receiving trace data from DP array 302 and programmable logic 304 are not required.

Figure 4A:
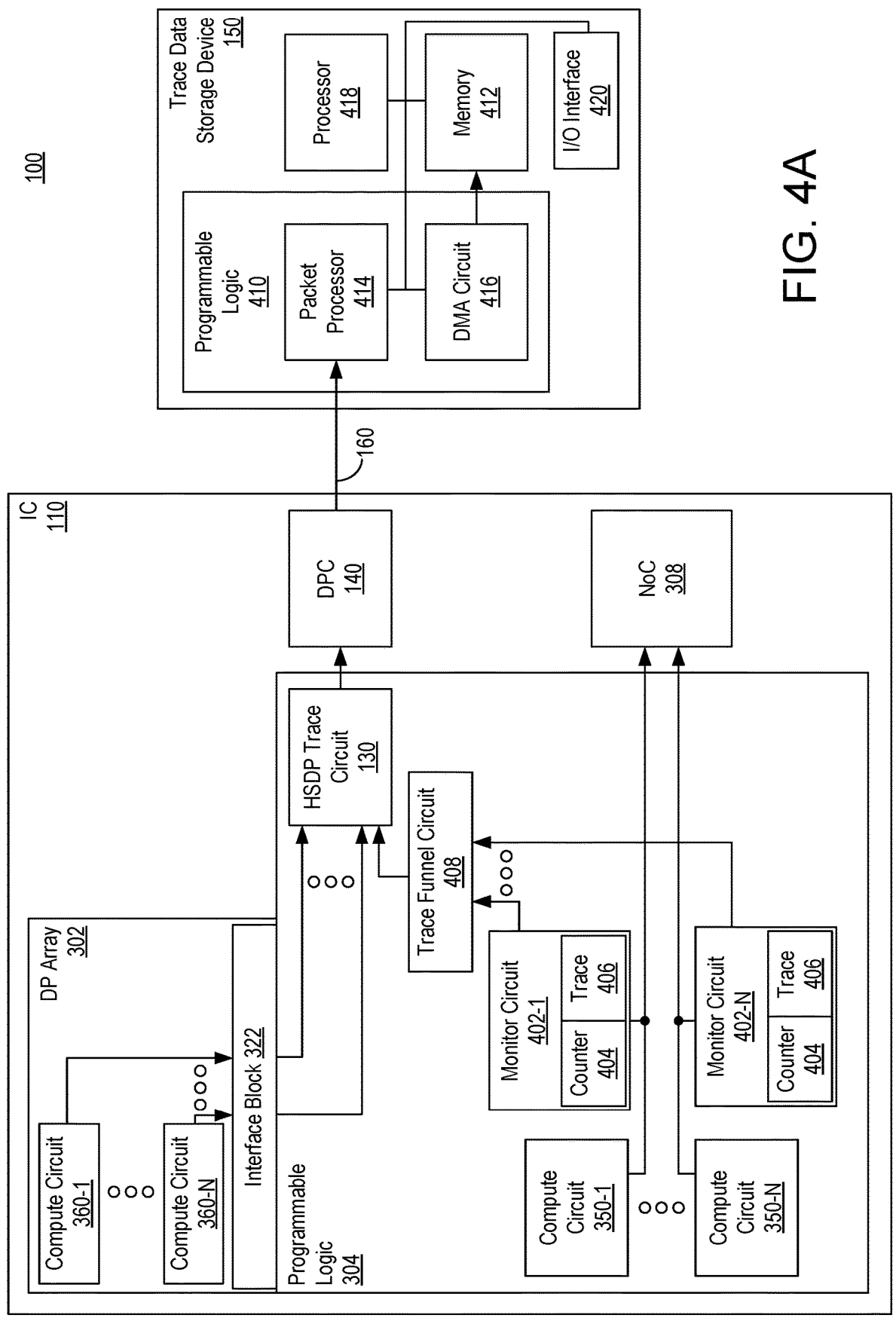
FIGS. 4A, 4B, and 4C illustrate example implementations of the system of FIG. 1.
Figure 4B:
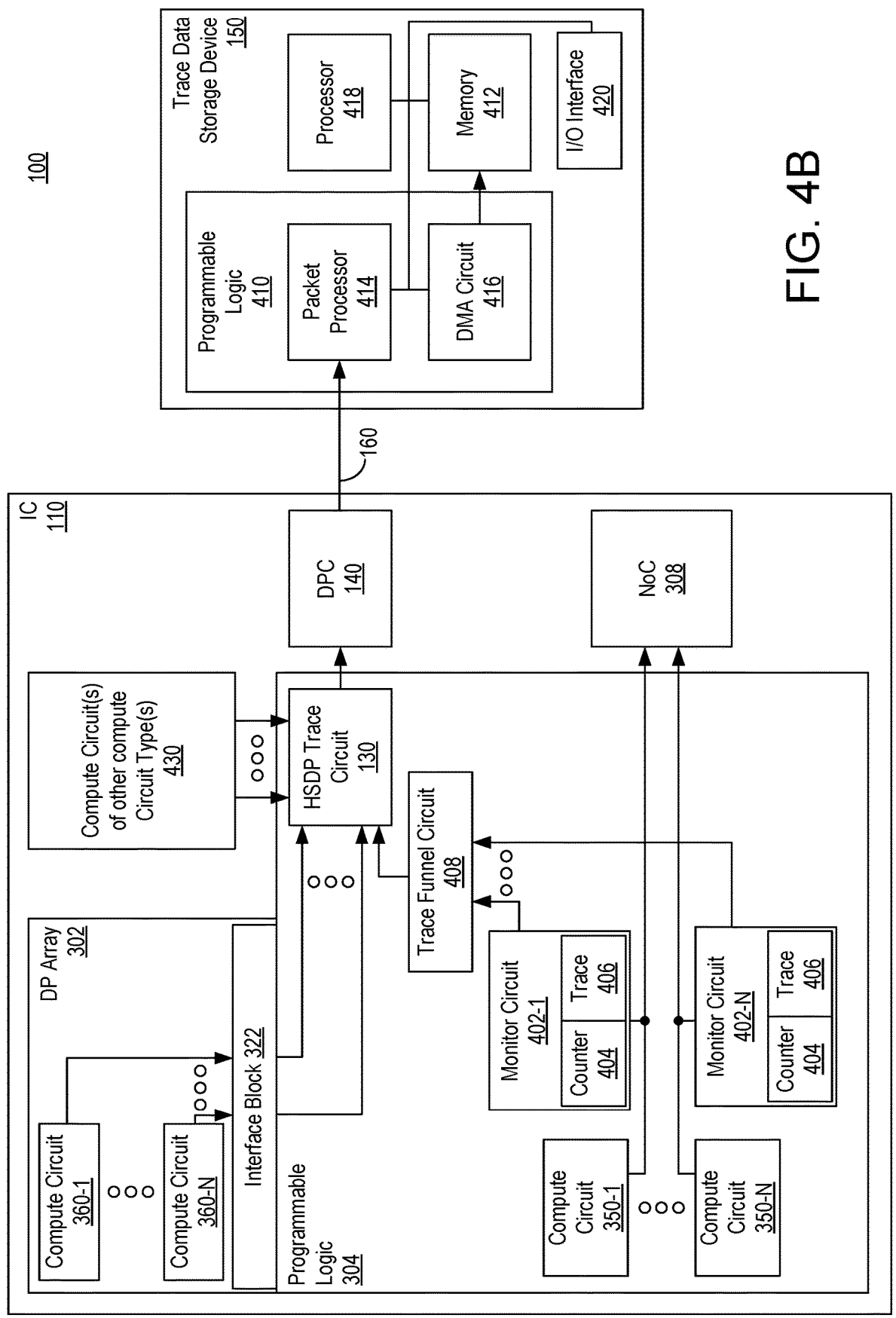
Figure 4C:
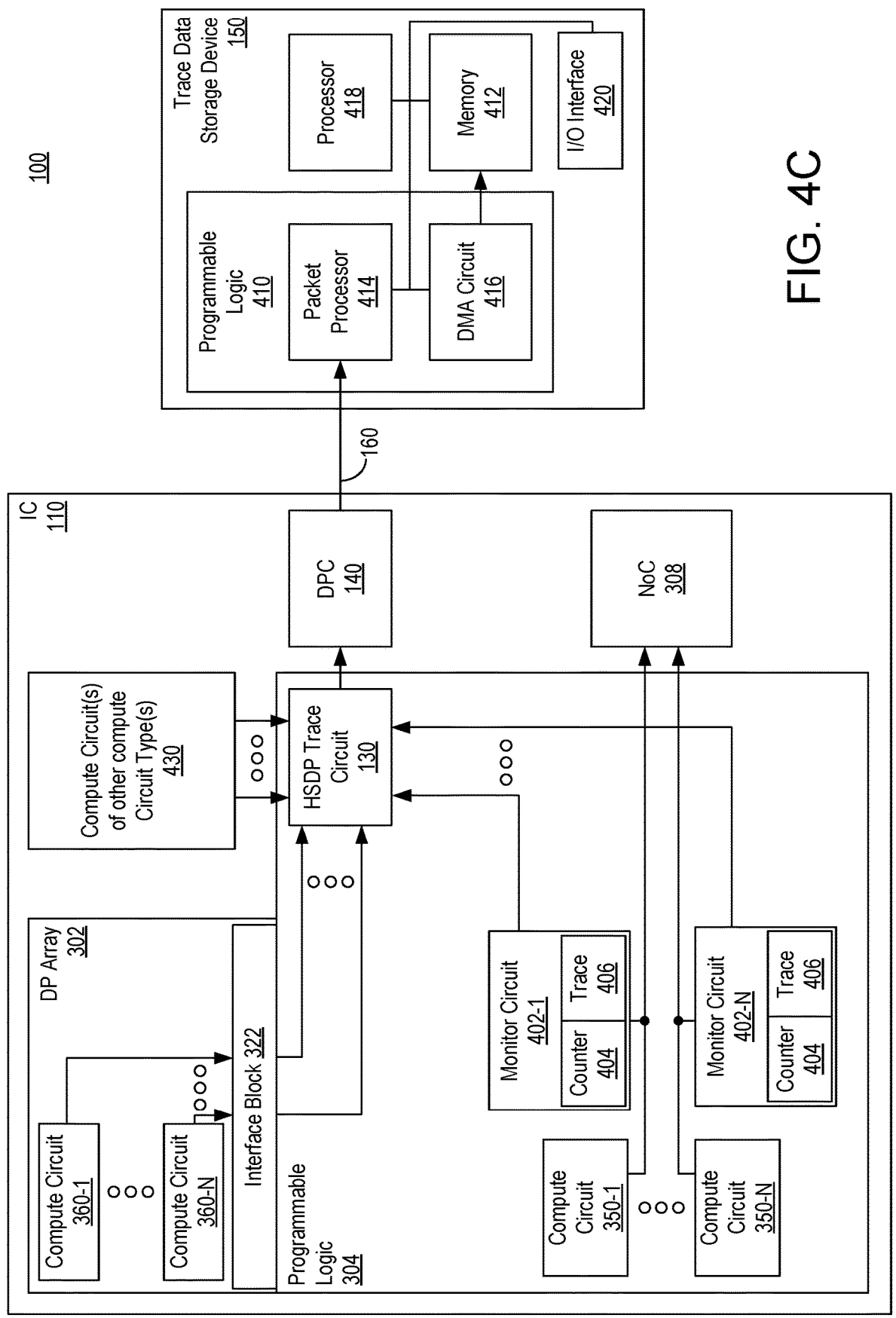

FIGS. 4A, 4B, and 4C illustrate example implementations of system 100. In the example of FIG. 4A, streams of trace data from a plurality of compute circuits 360 may be directly connected to stream inputs (e.g., AXI stream inputs) of HSDP trace circuit 130. Monitor circuits 402 have been inserted into the user design and implemented in programmable logic 304. Each monitor circuit 402 may include a counter 404 and trace circuitry 406. Monitor circuits 402 may be added to AXI buses and/or connections to compute circuits 350 to generate trace data that may be output from each respective monitor circuit 402 as a stream to a trace funnel circuit 408. Trace funnel circuit 408 is capable of combining the received trace data from each respective monitor circuit 402 and outputting a single stream including the trace data from each of monitor circuits 402 (e.g., interspersed) to a stream input (e.g., an AXI stream input) of HSDP trace circuit 130.

For purposes of illustration, HSDP trace circuit 130 may include 16 stream inputs that may be coupled to DP array 302. As such, HSDP trace circuit 130 is capable of receiving up to 16 streams of trace data from DP array 302. HSDP trace circuit 130 may include one (e.g., additional) stream input that couples to trace funnel circuit 408. As such, HSDP trace circuit 130 is capable of receiving one stream of trace data from programmable logic 304. Appreciably, in view of trace funnel circuit 408, the single stream may include trace data from a plurality of different compute circuits 350. It should be appreciated that the particular number of stream inputs for the different types of compute circuits are provided for purposes of illustration only. Different numbers of input ports may be included than described. For example, fewer or more than 16 stream inputs for DP array 302 may be included and more than one stream input for programmable logic 304 may be included.

In one or more example implementations, the stream inputs of HSDP trace circuit 130 are implemented as agent interfaces, where the DP array 302 and trace funnel circuit 408 operate as principals. In this regard, the agent circuitry operates under control or responsive to the principal circuit. HSDP trace circuit 130 may include a single output (e.g., an AXI memory mapped output). The output of HSDP trace circuit 130 may operate as an agent interface with respect to DPC 140 coupled thereto. DPC 140 operates as a principal with respect to the output of HSDP trace circuit 130.

As discussed, because HSDP trace circuit 130 is implemented in programmable logic 304, HSDP trace circuit 130 is highly configurable. The following is a list of configuration parameters of HSDP trace circuit 130 (e.g., of the HSDP IP core) that may be set or specified by a user based on the particular design in which the HSDP trace circuit 130 is to be included.

- Number of types of compute circuits from which trace data is to be received. For example, a "1" may indicate that only a single type of compute circuit will be sending trace data (e.g., either DP array 302 only or programmable logic 304 only). A "2" may indicate that both the DP array 302 and the programmable logic 304 are expected to send trace data. In this regard, the number of types of compute circuits indicates the particular types of connections being established with HSDP trace circuit 130. In other arrangements, particular values may indicate particular combinations of compute circuit types sending trace data, e.g., where there may be more than 2 and/or different compute circuit type combinations used.
- The number of inputs for each type of compute circuit. For example, the number of streams for DP array 302 may be set to a value from 1-16. The number of streams from programmable logic 304 may be set to 1. The number of stream inputs of HSDP trace circuit 130 devoted to each particular type of compute circuit may be set based on these parameters and implemented during the flow illustrated in FIG. 2.
- The size of packets of trace data to be received.
- The data width of the streams of trace data.
- A depth of a first-in-first-out (FIFO) memory instantiated on each stream input of HSDP trace circuit 130.

By appropriately configuring HSDP trace circuit 130, resources of programmable logic 304 may be conserved when not needed thereby making such resources available for the user design. That is, HSDP trace circuit 130 is implemented to accommodate only the number of streams, FIFO depths, and data widths indicated by the configuration parameters above. This allows for smaller implementations when not all of the foregoing features (e.g., fewer than the maximum number of input streams supported) are required.

HSDP trace circuit 130 is capable of arbitrating among the plurality of streams of trace data received to generate a single output of trace data (e.g., a single output stream of trace data) to DPC 140. DPC 140 is capable of packetizing the received trace data to generate DTPs that may be conveyed over communication link 160 to trace data storage device 150. The arbitration scheme is described in greater detail hereinbelow with reference to FIG. 6.

In one aspect, HSDP trace circuit 130 is capable of adding a compute circuit type identifier to received trace data. That is, for each packet of trace data received on a received stream, HSDP trace circuit 130 is capable of adding a compute circuit type identifier to that trace data. The compute circuit type identifier indicates the type of compute circuit (e.g., the circuit subsystem of IC 110) from which the trace data originated. This insertion operation need only be performed in cases where there is more than one compute circuit type connected to HSDP trace circuit 130.

As an illustrative example, each packet of trace data received from DP array 302 (e.g., a compute circuit 120 such as a compute circuit 360 implemented in DP array 302) will have a same compute circuit type identifier added thereto. Each packet of trace data received from programmable logic 304 (e.g., a compute circuit 120 such as a compute circuit 350 implemented in programmable logic 304) will have a same compute circuit type identifier added thereto. Thus, the compute circuit type identifier added to received packets of trace data by HSDP trace circuit 130 indicates the type of compute circuit that generated the trace data. In one aspect, the compute circuit type identifier may be ascertained by HSDP trace circuit 130 based on the particular stream input over which the trace data is received.

During operation of the design as loaded in IC 110, trace data generated by DP array 302 and/or programmable logic 304 is provided to HSDP trace circuit 130. In the example, DPC 140, acting as principal, is capable of periodically issuing read requests to obtain trace data (e.g., packets of trace data as generated by DP array 302 and/or monitor circuits 402). More particularly, DPC 140 is capable of polling or requesting data from HSDP trace circuit 130 as opposed to HSDP trace circuit 130 pushing data to DPC 140. That is, data cannot be pushed to DPC 140 as DPC 140 is a principal.

DPC 140 is capable of packetizing the received data as DTPs by performing operations that may include, but are not limited to, adding header data, adding information such as the number of words included in the packet, adding cyclic redundancy check (CRC) and/or other error checking data. Once DTPs are formed, DPC 140 sends the DTPs over communication link 160 to trace data storage device 150. In one aspect, DPC 140 is implemented as a hardened circuit block. In this regard, DPC 140 is configured to receive a single input of trace data from HSDP trace circuit 130. HSDP trace circuit 130, being implemented in programmable circuitry (e.g., programmable logic), may operate as a programmable interface to DPC 140 to accommodate a user-specified number of input streams.

In the examples, in cases where multiple different compute circuit types are used, additional header data such as the number of words in a packet is added as the compute circuits of different compute circuit types may generate trace data of different sizes. Such data, e.g., the number of words in a packet, is not added or necessary in cases where only a single type of compute circuit is used as the trace data will be of consistent size. This simplifies data extraction performed by trace data storage device 150.

In the example of FIG. 4A, trace data storage device 150 may be implemented to include programmable logic 410, a memory 412, a processor 418, and an I/O interface 420. In one aspect, processor 418 and/or I/O interface 420 are implemented as hardened circuit blocks. Memory 412 may be RAM such as DDR RAM as previously discussed. In the example, the amount of memory 412 included in trace data storage device 150 may be sizeable, e.g., in the multi-gigabyte range. Programmable logic 410 may be configured to implement a packet processor 414 and a direct memory access (DMA) circuit 416. Processor 418 is capable of executing program code to performing various configuration operations. For example, processor 418 is capable of configuring packet processor 414 and DPC 140 for operation. Once processor 418 configures packet processor 414 and DPC 140, processor 418 is not involved with the storage of trace data during operation. Though not involved in the collection and/or storage of trace data, processor 418 is involved in the outputting of trace data from memory 412 via I/O interface 420 to other external systems.

The large amount of memory available in trace data storage device 150 provides what may be considered a virtually limitless ability (relative to on-chip memory and still limited to the capacity and/or bandwidth of memory 412) to store trace data. By comparison, storing trace data within an on-chip DDR RAM, for example, would likely require that the amount of trace data stored to be restricted by a significant amount or that a large amount of trace data be dropped in order to provide the ability to collect trace data for the desired period of time.

Packet processor 414 is capable of extracting trace data from the received DTPs. For example, packet processor 414 is capable of stripping off, from the DTPs, the header information and error checking data. Other data such as the compute circuit type identifier and/or the number of words in a packet may be left intact. DMA circuit 416 is capable of receiving the trace data, as extracted, from packet processor 414 and writing or storing the trace data, as extracted from the DTPs, in memory 412.

In the example, the trace data from the different compute circuits may be stored as received within memory 412. In this regard, the trace data from the different compute circuits may be commingled within memory 412 in a serialized state as received from DPC 140. Trace data is not disentangled or stored in different regions in memory based on compute circuit type. As noted, the trace data still retains information such as the word count and compute circuit type identifier.

In one or more example implementations, processor 418 is capable of reading the trace data out from memory 412 and providing the trace data, via I/O interface 420, to an external system such as the data processing system 700 of FIG. 7. I/O interface 420 may be a high-speed interface (e.g., PCIe or other interface), a JTAG interface, or the like. Processor 418 is capable of separating the debug data according to compute circuit type post capture. For example, processor 418, in reading the trace data out of memory 412, is capable of separating the trace data by compute circuit type using the compute circuit type identifiers still included in the trace data. In one aspect, processor 418 is capable of separating the trace data by compute circuit type in response to a request for the trace data received from the external system.

As an illustrative and non-limiting example, processor 418 may differentiate between the different types of trace data according to the compute circuit type that generated the trace data. Processor 418 may output trace data for only the first type of compute circuit, and then output trace data for only the second type of compute circuit. This allows the receiving system to readily store the received trace data in different files if so configured. Trace data originating from the DP array may be stored in a first data file while trace data originating from programmable logic compute circuits may be stored in a second and different data file in the external system. The external system, e.g., computer, is capable of performing further processing on the received trace data such as may be required to visualize the trace data.

Before running the user design generated using the process illustrated in FIG. 2 in a target IC, e.g., IC 110, DPC 140 must be configured with the address of the HSDP IP core as linked with the design. In one aspect, runtime script(s) that are generated as part of the compilation process may be executed by processor 418 to configure aspects of IC 110. In executing the runtime script(s), processor 418 is capable of retrieving the address of HSDP trace circuit 130 from the binary image, configuring DPC 140 with the address of HSDP trace circuit 130 (e.g., the address from which to read trace data), and configuring packet processor 414 to communicate with DPC 140. Further, if trace functions are activated in certain compute circuits (e.g., DP array 302 as described in connection with FIG. 3), runtime configuration parameters for such compute circuits may be set by processor 418 within the various compute circuits of IC 110.

In one or more example implementations, HSDP trace circuit 130 adds the compute circuit type identifier to received trace data only when configured to do so at link time. That is, at link time, all of the input connections for HSDP trace circuit 130 are implemented and HSDP trace circuit 130 is appropriately configured. Accordingly, during operation, HSDP trace circuit 130 adds type identifiers to received trace data only in cases where HSDP trace circuit 130 was configured at link time to receive trace data from multiple different types of compute circuits. In cases where HSDP trace circuit 130 was configured at link time to receive trace data from only a single type of compute circuit, HSDP trace circuit 130 does not add a compute circuit type identifier to the received trace data.

In addition or in the alternative, in cases where HSDP trace circuit 130 is configured during linking to receive trace data from more than one different type of compute circuit, a user is permitted to enable only a single compute circuit type for runtime, e.g., when HSDP trace circuit 130 executes. HSDP trace circuit 130 will receive trace data only for the enabled input. In that case, HSDP trace circuit 130 still adds compute circuit identifiers to the received trace data. Other components in the architecture operate with the expectation that trace data is received from multiple different types of compute circuits and that DTPs will insert compute circuit type identifiers. The DTPs, in this example, may include only compute circuit type identifiers of a same type.

FIG. 4B illustrates another example of system 100 that is substantially similar to the example of FIG. 4A. In the example of FIG. 4B, one or more additional compute circuits 430 of one or more different compute circuit types are illustrated. As shown, HSDP trace circuit 130 may include additional stream inputs to receive streams of trace data from such other compute circuits. Compute circuits 430 may be functions executed by a processor system (e.g., one or more processors) in IC 110, implemented in hardwired circuit blocks, or implemented using other systems of IC 110. HSDP trace circuit 130 may operate as described by inserting appropriate compute type identifiers on the respective streams of trace data received.

FIG. 4C illustrates another example of system 100 that is substantially similar to the examples of FIGS. 4A and 4B. In the example of FIG. 4C, trace funnel circuit 408 is omitted. In that case, HSDP trace circuit 130 may include additional stream inputs to receive one or more streams of trace data from different monitor circuits 402 implemented in programmable logic 304.

Figure 5A:
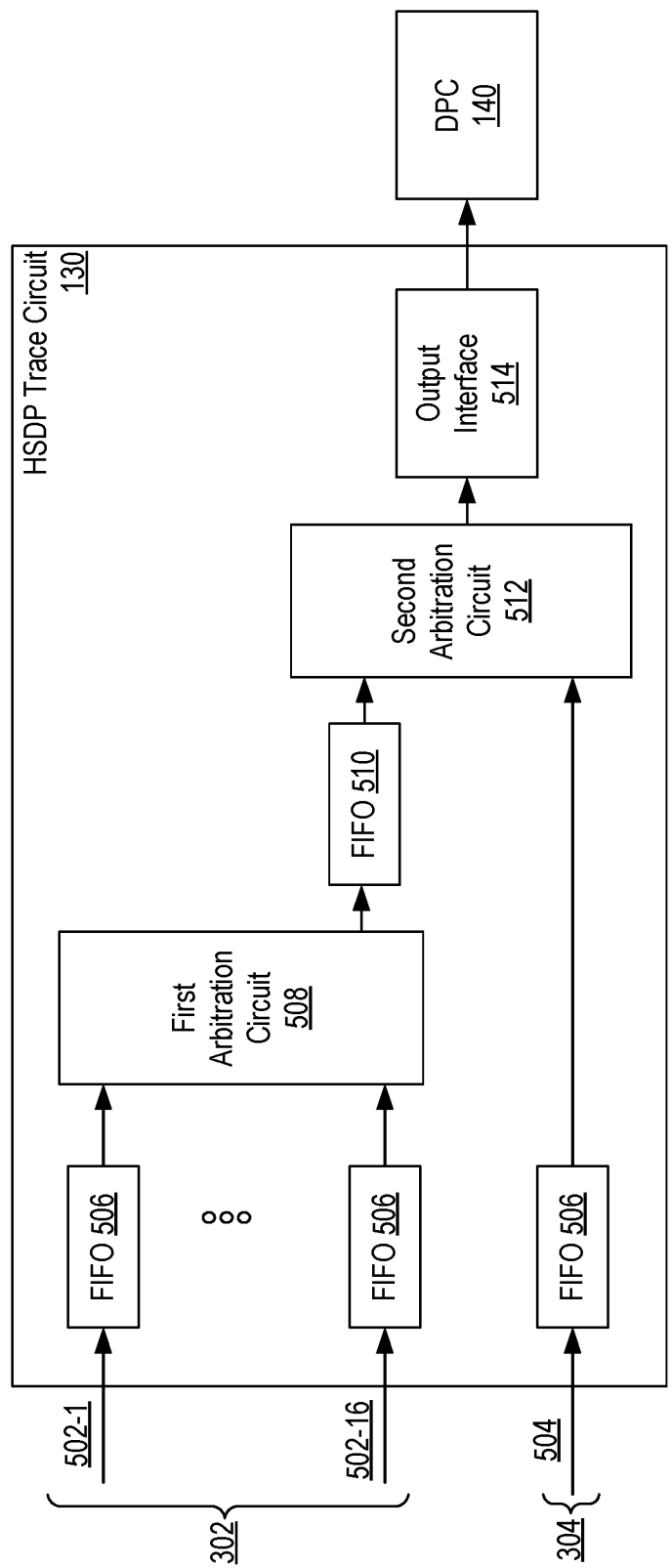
FIGS. 5A, 5B, and 5C illustrate example implementations of a high-speed debug port trace circuit.
Figure 5B:
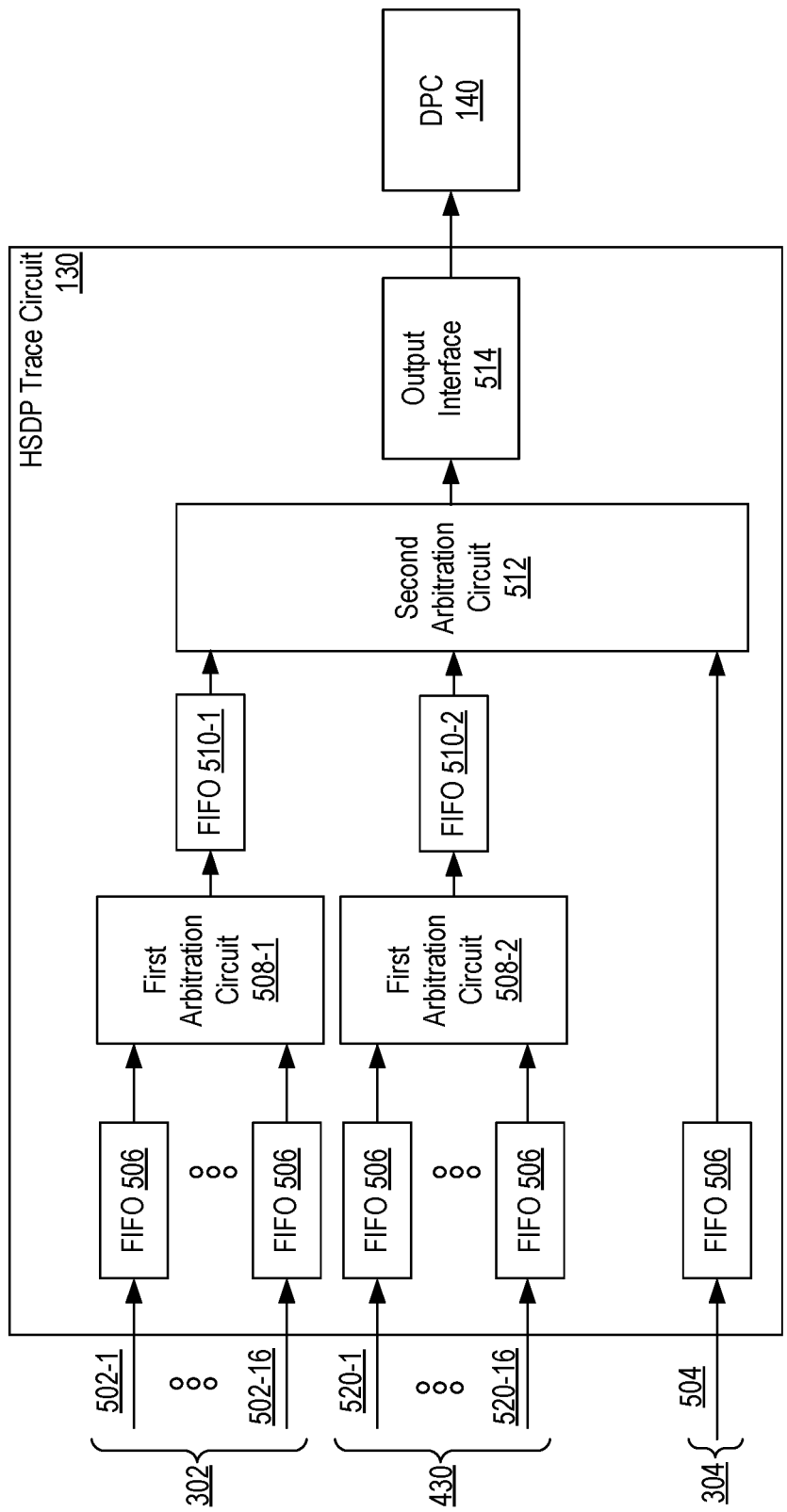
Figure 5C:
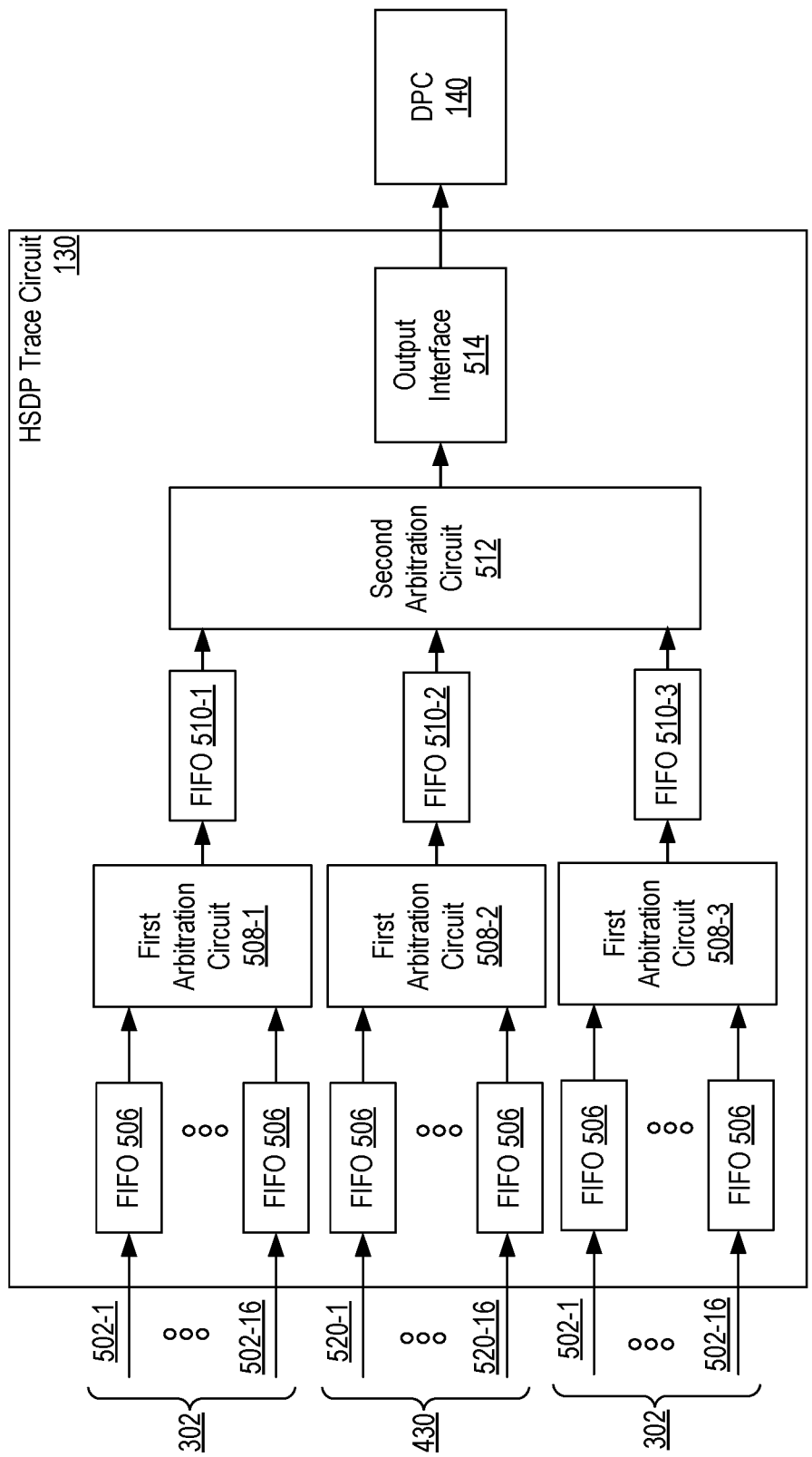

FIGS. 5A, 5B, and 5C illustrate example implementations of a high-speed debug port trace circuit. FIG. 5A illustrates an example implementation of HSDP trace circuit 130 that may be used with the example illustrated in FIG. 4A. In the example of FIG. 5A, HSDP trace circuit 130 includes a plurality of stream inputs 502 (e.g., 502-1 through 502-16) and a stream input 504. For purposes of illustration, HSDP trace circuit 130, as shown in FIG. 5A, is configured to receive 16 streams from DP array 302 and a stream from programmable logic 304. Each of stream inputs 502 is capable of receiving a stream of trace data from DP array 302. Stream input 504 is capable of receiving a stream of trace data from programmable logic 304 and, more particularly, trace funnel circuit 408. Each of stream inputs 502 and stream input 504 includes a FIFO 506. FIFOs 506 may be sized based on the user-specified configuration parameters discussed in connection with FIG. 4A.

In the example, each of stream inputs 502 is coupled to first arbitration circuit 508. An output of first arbitration circuit 508 is coupled to FIFO 510. FIFO 510 may be sized based on the user-specified configuration parameters discussed in connection with FIG. 4A. Second arbitration circuit 512 has two input ports. A first of the input ports of stream second arbitration circuit 512 is coupled to an output of FIFO 510. A second of the input ports of second arbitration circuit 512 is coupled to an output of FIFO 506 corresponding to stream input 504. An output of second arbitration circuit 512 is coupled to an output interface 514. Output interface 514 may include a FIFO (not shown) from which DPC 140 may read packets (e.g., as a memory mapped interface). Output interface 514 is coupled to DPC 140. Stream output circuit 512 is capable of selecting data from arbitration circuit 508 or data from FIFO 506 of stream input 504 for outputting to DPC 140 in response to a read request from DPC 140.

In general, HSDP trace circuit 130 is capable of performing round-robin scheduling among stream inputs 502. In one aspect, HSDP trace circuit 130 is capable of arbitrating among active ones of stream inputs 502 simultaneously. For example, arbitration circuit 508 is capable of first arbitrating among streams of trace data received by stream inputs 502 (e.g., like streams originating from compute circuits of a same type). Second arbitration circuit 512 may then arbitrate between the stream selected by arbitration circuit 508 and output therefrom and the stream received by stream input 504 (e.g., the streams of different types of compute circuits).

For example, first arbitration circuit 508 is capable of performing a first arbitration among a subset of two or more of the plurality of streams of trace data originating from compute circuits of a same compute circuit type, while second arbitration circuit 512 is capable of performing a second arbitration between a stream output from the first arbitration and a stream of the trace data originating from a different compute circuit type. In the example, second arbitration circuit 512 is capable of adding the compute circuit type identifier to debug data received from stream inputs 502 (e.g., as obtained from FIFO 510) indicating a first type of compute circuit and to debug data received from stream input 504 indicating a second and different type of compute circuit.

FIG. 5B illustrates another example implementation of HSDP trace circuit 130 that may be used with the example illustrated in FIG. 4B. In the example of FIG. 5B, HSDP trace circuit 130 is implemented substantially similar to the example of FIG. 5A. In the example of FIG. 5B, however, first arbitration circuit 508 is implemented as first arbitration circuits 508-1 and 508-2. First arbitration circuit 508-1 arbitrates among stream inputs 502 while first arbitration circuit 508-2 arbitrates between stream inputs 520 as received from the one or more additional compute circuits 430. Both first arbitration circuits 508-1 and 508-2 may perform a round robin type of arbitration. First arbitration circuit 508-1 outputs data to FIFO 510-1. First arbitration circuit 508-2 outputs data to FIFO 510-2. Second arbitration circuit 512 arbitrates between data read from FIFO 510-1, FIFO 510-2, and FIFO 506 for stream input 504. Whereas the second arbitration circuit 512 of FIG. 5A may alternate between outputting data from different inputs, in the example of FIG. 5B, stream output circuit 512 may implement a particular type of arbitration (e.g., a same or similar type of arbitration as implemented by arbitration circuits 508).

FIG. 5C illustrates another example implementation of HSDP trace circuit 130 that may be used with the example illustrated in FIG. 4C. In the example of FIG. 5C, HSDP trace circuit 130 is implemented substantially similar to the examples of FIGS. 5A and 5B. In the example of FIG. 5C, however, first arbitration circuit 508 is implemented as first arbitration circuits 508-1, 508-2, and 508-3. First arbitration circuit 508-1 arbitrates among stream inputs 502. First arbitration circuit 508-2 arbitrates between stream inputs 520 as received from the one or more compute circuits 430. First arbitration circuit 508-3 arbitrates between the different streams of data received over stream inputs 502. Each of first arbitration circuits 508 may perform a round robin type of arbitration. First arbitration circuit 508-1 outputs data to FIFO 510-1. First arbitration circuit 508-2 outputs data to FIFO 510-2. First arbitration circuit 508-3 outputs data to FIFO 510-3. Second arbitration circuit 512 arbitrates between data read from FIFO 510-1, FIFO 510-2, and FIFO 510-3. In the example of FIG. 5C, second arbitration circuit 512 may implement a particular type of arbitration (e.g., a same or similar type of arbitration as implemented by first arbitration circuits 508).

In the examples of FIGS. 4 and 5, when streams from more than one type of compute circuit are present, HSDP trace circuit 130 is capable of implementing two-level round-robin scheduling. Further, it should be appreciated that the different configurations illustrated in FIGS. 4 and 5, and variations thereof, may be implemented by virtue of selecting different implementation options at compile time of HSDP trace circuit 130.

FIG. 6 illustrates an example method 600 of operation of the trace data offload architecture illustrated in FIGS. 1, 3, 4, and 5. In block 602, HSDP trace circuit 130 receives a plurality of streams of trace data from a plurality of compute circuits 120 of different compute circuit types (e.g., DP array 302, programmable logic 304, or other compute circuit types). The plurality of compute circuits and HSDP trace circuit 130 are disposed in a same integrated circuit, e.g., IC 110.

In block 604, HSDP trace circuit 130 inserts compute circuit type identifiers within the trace data. The compute circuit type identifiers specify the compute circuit type from which respective ones of the plurality of streams of the trace data originate. The compute circuit type identifiers may be inserted into individual packets of trace data. In block 606, DPC 140 is capable of generating DTPs from the trace data and transmitting the DTPs over a high-speed communication link 160 to trace data storage device 150. Trace data storage device 150 is external to IC 110.

In block 608, trace data storage device 150 is capable of storing the trace data from the received DTPs. For example, packet processor 414 is capable of extracting the debug data from the received DTPs by removing the header information and error checking data added by DPC 140. DMA circuit 416 stores the extracted data into memory 412. The trace data may be stored in a commingled manner, e.g., in the order received from DPC 140. As noted, information such as the compute circuit identifiers and the number of words for the respective DTPs are left intact.

In block 610, for example, in response to a request from a computer to obtain the trace data, trace data storage device 150 is capable of differentiating between the debug trace packets according to the compute circuit type identifiers. For example, processor 418 is capable of differentiating between the debug packets based on the compute circuit type identifiers included therein as stored in memory 412. In block 612, trace data storage device 150 and, more particularly, processor 418, is capable of reading the trace data out of memory 412 based on compute circuit type identifiers. That is, processor 418 may output the trace data for a first type of compute circuit together and then read out the trace data for a second and different type of compute circuit. Processor 418 may read out all trace data for the first type of compute circuit followed by all trace storing the trace data for the second type of compute circuit. In another example, processor 418 may alternate between reading out trace data for different compute circuits iteratively (e.g., output a particular amount of trace data or output trace data for a predetermined amount of time for a first type of compute circuit followed by trace data for the second type of compute circuit in a particular amount or for the predetermined amount of time).

FIG. 7 illustrates an example implementation of a data processing system 700. Data processing system 700 is an example of a system that may be used to implement the flow described in connection with FIG. 2. In addition, data processing system 700 is an example of a host data processing system that may operate in coordination and in communication with an IC 110 and trace data storage device 150 as described herein.

As defined herein, the term "data processing system" means one or more hardware systems configured to process data, each hardware system including at least one hardware processor and memory, wherein the hardware processor is programmed with computer-readable instructions that, upon execution, initiate operations. Data processing system 700 can include a hardware processor 702, a memory 704, and a bus 706 that couples various system components including memory 704 to processor 702.

Hardware processor 702 may be implemented as one or more hardware processors. In an example, hardware processor 702 is implemented as a central processing unit (CPU). Hardware processor 702 may be implemented as one or more circuits capable of carrying out instructions contained in program code. The circuits may be implemented as an integrated circuit or embedded in an integrated circuit. Hardware processor 702 may be implemented using a complex instruction set computer architecture (CISC), a reduced instruction set computer architecture (RISC), a vector processing architecture, or other known architectures. Example hardware processors include, but are not limited to, hardware processors having an x86 type of architecture (IA-32, IA-64, etc.), Power Architecture, ARM processors, and the like.

Hardware processor 702 is an example of a processor that may execute an application and initiate and/or control operation of compute circuits 120 such as DP array 302 and/or programmable logic 304 within IC 110. In this regard, hardware processor 702 may enter a hung state where the hardware processor is non-responsive to received input and/or discontinues operation. In the example, the program code executed by hardware processor 702 is the application that offloads tasks to compute circuits 120 of IC 110. In this example, execution of that application is terminated or disrupted. As discussed, disruption of the application and/or hardware processor 702 (e.g., whether hardware processor 702 or an embedded processor within processor system 306 of IC 110 that may execute the application) will not affect or interrupt the collection of trace data as performed by the inventive arrangements described herein. That is, operations such as receiving trace data, processing the trace data, packetizing the trace data, sending the trace data to trace data storage device 150, and storing the trace data are unaffected and may continue to operate uninterrupted.

Bus 706 represents one or more of any of a variety of communication bus structures. By way of example, and not limitation, bus 706 may be implemented as a Peripheral Component Interconnect Express (PCIe) bus. Data processing system 700 typically includes a variety of computer system readable media. Such media may include computer-readable volatile and non-volatile media and computer-readable removable and non-removable media.

Memory 704 can include computer-readable media in the form of volatile memory, such as random-access memory (RAM) 708 and/or cache memory 710. Data processing system 700 also can include other removable/non-removable, volatile/non-volatile computer storage media. By way of example, storage system 712 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 706 by one or more data media interfaces. Memory 704 is an example of at least one computer program product.

Memory 704 is capable of storing computer-readable program instructions that are executable by hardware processor 702. For example, the computer-readable program instructions can include an operating system, one or more application programs, other program code, and program data. In one example, the program code may include instructions that, when executed, cause hardware processor 702 to perform the operations described in connection with FIG. 2. Hardware processor 702, in executing the computer-readable program instructions, is capable of performing the various operations described herein that are attributable to a computer. It should be appreciated that data items used, generated, and/or operated upon by data processing system 700 are functional data structures that impart functionality when employed by data processing system 700. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a hardware processor.

Data processing system 700 may include one or more Input/Output (I/O) interfaces 718 communicatively linked to bus 706. I/O interface(s) 718 allow data processing system 700 to communicate with one or more external devices and/or communicate over one or more networks such as a local area network (LAN), a wide area network (WAN), and/or a public network (e.g., the Internet). Examples of I/O interfaces 718 may include, but are not limited to, network cards, modems, network adapters, hardware controllers, etc. Examples of external devices also may include devices that allow a user to interact with data processing system 700 (e.g., a display, a keyboard, and/or a pointing device) and/or other devices such as accelerator card.

Data processing system 700 is only one example of computer hardware and/or a host data processing system. Data processing system 700 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 7 is not intended to suggest any limitation as to the scope of use or functionality of example implementations described herein. Data processing system 700 is an example of computer hardware that is capable of performing the various operations described within this disclosure. In this regard, data processing system 700 may include fewer components than shown or additional components not illustrated in FIG. 7 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a hardware processor may include at least some memory.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "real-time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These elements should not be limited by these terms, as these terms are only used to distinguish one element from another unless stated otherwise or the context clearly indicates otherwise.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a high-speed debug port trace circuit of an integrated circuit, a plurality of streams of trace data from a plurality of compute circuits of different compute circuit types within the integrated circuit;
   including compute circuit type identifiers within the trace data, wherein the compute circuit type identifiers specify compute circuit types from which respective ones of the plurality of streams of the trace data originate;
   generating, by a debug packet controller within the integrated circuit, debug trace packets specifying the trace data including the compute circuit type identifiers and transmitting the debug trace packets over a communication link to a trace data storage device that is external to the integrated circuit, wherein the debug trace packets are created by including, within each debug trace packet, a number of words of trace data included in the debug trace packet, and wherein the number of words in a packet is variable and depends on compute circuit type; and
   storing the trace data from the debug trace packets in a memory of the trace data storage device by writing the number of words, the compute circuit type identifiers, and the trace data from the debug trace packets within the memory of the trace data storage device, leaving the number of words, the compute circuit type identifiers, and the trace data of the debug trace packets intact;
   wherein the high-speed debug port trace circuit is configured to include a number of input ports, based on a user-specified configuration parameter, to receive streams of trace data from one or more first compute circuits of the plurality of compute circuits of a first compute circuit type.

2. The method of claim 1, wherein the high-speed debug port trace circuit is implemented using programmable circuitry.

3. The method of claim 2, wherein the first compute circuit type is a data processing array including a plurality of compute tiles each having a core capable of executing program code and a memory, and wherein two or more of the plurality of compute tiles of the data processing array provide two or more of the plurality of streams of the trace data to the high-speed debug port trace circuit.

4. The method of claim 2, wherein the high-speed debug port trace circuit is implemented to receive a user-specified data stream from one or more second compute circuits of the plurality of compute circuits, wherein the one or more second compute circuits are implemented as a second compute circuit type.

5. The method of claim 4, wherein the one or more second compute circuits of the second compute circuit type are implemented in the programmable circuitry.

6. The method of claim 1, wherein the generating debug trace packets further comprises:
   creating the debug trace packets by adding, for each debug trace packet, a header.

7. The method of claim 6, wherein the storing the trace data from the debug trace packets in the memory further comprises:
   removing the headers from the debug trace packets using a packet processor of the trace data storage device.

8. The method of claim 1, further comprising:
   continuing to receive the trace data from the plurality of compute circuits, generate debug trace packets, and transmit the debug trace packets to the trace data storage device while a processor executing program code and coupled to the plurality of compute circuits is in a hung state.

9. The method of claim 1, further comprising:
   differentiating between the trace data according to the compute circuit type identifiers; and
   outputting the trace data according to the compute circuit types to an external data processing system.

10. The method of claim 1, wherein the trace data storage device includes a processor and a packet processor, wherein the processor of the trace data storage device is capable of configuring the packet processor for operation and configuring the debug packet controller within the integrated circuit to communicate with the high-speed debug port trace circuit.

11. A system, comprising:
    an integrated circuit including:
       a plurality of compute circuits of different compute circuit types;
       a high-speed debug port trace circuit configured to receive a plurality of streams of trace data from the plurality of compute circuits configured to insert compute circuit type identifiers within the trace data, wherein the compute circuit type identifiers specify compute circuit types from which different streams of the trace data originate;
       wherein the high-speed debug port trace circuit is configured to include a number of input ports, based on a user-specified configuration parameter, to receive streams of trace data from one or more first compute circuits of the plurality of compute circuits of a first compute circuit type; and
       a debug packet controller coupled to the high-speed debug port trace circuit, wherein the debug packet controller is configured to generate debug trace packets from the trace data and convey the debug trace packets over a communication link outside of the integrated circuit, wherein the debug trace packets are created by including, within each debug trace packet, a number of words of trace data included in the debug trace packet, and wherein the number of words in a packet is variable and depends on compute circuit type; and
    a trace data storage device external to the integrated circuit, coupled to the communication link, and configured to store the trace data from the debug trace packets in a memory of the trace data storage device, leaving the number of words, the compute circuit type identifiers, and the trace data of the debug trace packets intact.

12. The system of claim 11, wherein the high-speed debug port trace circuit comprises:
    a plurality of stream inputs coupled to the plurality of compute circuits, wherein the plurality of stream inputs are configured to receive the plurality of streams of trace data and operate as agents; and an output interface coupled to the debug packet controller, wherein the output interface is configured to convey the trace data to the debug packet controller, and wherein the output interface is configured to operate as an agent of the debug packet controller.

13. The system of claim 11, wherein the high-speed debug port trace circuit is configured to:
perform a first arbitration among a subset of two or more of the plurality of streams of trace data originating from one or more compute circuits of the plurality of compute circuits of a same compute circuit type; and
perform a second arbitration between a stream output from the first arbitration and a stream of the trace data originating from a different compute circuit of the plurality of compute circuits of a different compute circuit type.

14. The system of claim 11, wherein the trace data storage device includes:
a packet processor configured to extract trace data from the debug trace packets;
a direct memory access circuit coupled to the packet processor; and
the memory, wherein the direct memory access circuit is configured to store the trace data in the memory as extracted.

15. The system of claim 11, wherein:
the debug packet controller is configured to generate the debug trace packets by, at least in part, adding headers.

16. The system of claim 11, wherein the trace data storage device includes a processor, wherein the processor is configured to:
differentiate between the trace data stored in the memory according to the compute circuit type identifiers; and
output the trace data according to the compute circuit types to an external data processing system.

17. The system of claim 11, wherein:
the high-speed debug port trace circuit is implemented using programmable circuitry.

18. The system of claim 17, wherein:
the first compute circuit type is a data processing array configured to provide a plurality of streams of the trace data to the high-speed debug port trace circuit.

19. The system of claim 17, wherein:
the high-speed debug port trace circuit is implemented to receive a user-specified data stream from one or more second compute circuits of the plurality of compute circuits;
the one or more second compute circuits are implemented as a second compute circuit type; and
the one or more second compute circuits of the second compute circuit type are implemented in the programmable circuitry.

20. The system of claim 14, wherein the trace data storage device further comprises a processor capable of configuring the packet processor for operation and configuring the debug packet controller within the integrated circuit to communicate with the high-speed debug port trace circuit.

* * * * *